United States Patent [19]

Saunders et al.

[11] Patent Number: 5,422,018
[45] Date of Patent: Jun. 6, 1995

[54] CENTRIFUGE TUBE AND ADAPTOR

[75] Inventors: Alexander M. Saunders, San Carlos; Patricia J. Baldwin, Sunnyvale; Michael A. M. Zarowitz, San Carlos, all of Calif.

[73] Assignee: Applied Imaging, Santa Clara, Calif.

[21] Appl. No.: 189,249

[22] Filed: Jan. 31, 1994

[51] Int. Cl.⁶ .......................................... B01D 17/038
[52] U.S. Cl. ........................... 210/787; 210/515; 210/518; 210/521; 422/72; 436/45
[58] Field of Search ............... 210/767, 781, 782, 787, 210/789, 512, 515, 518, 361; 422/72; 494/16, 20, 31; 436/45, 177

[56] References Cited

U.S. PATENT DOCUMENTS

| | | | |
|---|---|---|---|
| 3,920,549 | 11/1975 | Gigliello et al. | 210/83 |
| 4,032,066 | 6/1977 | Wright | 233/26 |
| 4,159,896 | 7/1979 | Levine et al. | 23/230 |
| 4,246,123 | 1/1981 | Cornell et al. | 210/782 |
| 4,257,886 | 3/1981 | Kessler | 210/516 |
| 4,360,149 | 11/1982 | Hein, Jr. | 233/26 |
| 4,451,250 | 5/1984 | Romanauskas | 494/85 |
| 4,692,137 | 9/1987 | Anthony | 494/85 |
| 4,778,442 | 10/1988 | Gordon | 494/16 |
| 4,861,477 | 8/1989 | Kimura | 210/359 |
| 4,915,255 | 4/1990 | Curtis | 220/408 |
| 4,990,129 | 2/1991 | Nielson | 494/20 |
| 5,229,012 | 7/1993 | Pall et al. | 210/767 |
| 5,236,409 | 8/1993 | Romanauskas | 494/85 |

FOREIGN PATENT DOCUMENTS

| | | |
|---|---|---|
| 8400313 | 2/1984 | WIPO . |
| 9106373 | 5/1991 | WIPO . |

*Primary Examiner*—Joseph W. Drodge
*Assistant Examiner*—David Reitsnyder
*Attorney, Agent, or Firm*—Townsend and Townsend Khourie and Crew

[57] ABSTRACT

A centrifuge tube and adaptor apparatus is provided which facilitates separation of biological materials and permits easy extraction of a fraction after centrifugation. The tube is a deformable tube with a wide upper chamber and a narrowed lower portion. The tube is supported within the centrifuge rotor or within another container within the centrifuge by a liquid support medium, which surrounds and supports the narrow portion of the tube, and thus prevents the tube from collapsing during high speed centrifugations.

13 Claims, 1 Drawing Sheet

CENTRIFUGE TUBE AND ADAPTOR

The present invention pertains to centrifuge tubes and adapters for separation of biological materials, and more particularly to centrifuge tubes having liquid supports at narrowed central tube portions.

BACKGROUND OF THE INVENTION

Centrifugation is used to separate components in samples of biological materials according to the mass, density, and other sedimentation characteristics of the components, upon application of a gravitational field. Centrifuge tubes must withstand the applied gravitational forces and are typically cylindrical with a flat or slightly rounded bottom. The shape of the walls of the centrifuge tube imparts separation characteristics to the sample within the tube. Additional separation characteristics are provided by the temperature and chemical composition of the sample, the material of which the tube is constructed, and the relative masses and densities of the sample components.

In many clinical or research applications, a portion of the sample must be recovered for further analysis or purification. Where the portion or fraction to be recovered is at the top of the tube, isolation can be relatively simple, for example by aspiration or pipetting. However, where the fraction of interest is in a middle or lower fraction of the tube, recovery of that fraction may be complicated by possible re-contamination with other tube contents.

Attempts to overcome this problem include puncturing a side wall of the tube, for example, with a syringe, to remove the fraction of interest, as described in Sambrook et al, *Molecular Cloning*, 2nd Edition. This technique has inherent safety risks associated with the puncturing process and requires a readily puncturable tube. Additionally, this procedure is time consuming and also frequently leads to loss of sample. Other tubes have stoppers, plugs, or specialized accessories to disgorge the lowermost portion of the tube contents into another sample container, as described, for example in U.S. Pat. No. 4,861,477. However, where the sample fraction of interest is in the middle of the tube, recovery of the sample using these methods may be difficult and time consuming. Further, these techniques do not entirely obviate the problems of contamination of the sample with other biological fractions, or contamination of the work place with the blood sample itself.

Therefore, it would be desirable to have a centrifuge tube and apparatus which permits centrifugation of blood samples at speeds sufficient to separate cells according to their density and sedimentation characteristics, and which facilitates extraction of a blood sample with a minimum of cross contamination. Surprisingly, the present invention satisfies these and other related needs.

SUMMARY OF THE INVENTION

The present invention provides a tube which permits easy access to the sample within the tube, provides increased cell separation due to the shape of the interior walls of the tube, and facilitates recovery of the portion of interest through the widening of the bind at the narrowed portion of the tube.

In one embodiment of the invention, there is provided a tube and adapter apparatus for the centrifugation of a sample, the apparatus comprising a centrifuge tube having an upper chamber disposed on and integrally connected to a channel by an annular connecting segment, wherein the diameter of the channel is smaller than the diameter of the upper chamber; and an outer vessel having a top and a bottom, the top having an aperture, the aperture being capable of receiving the centrifuge tube therein, and wherein the outer vessel contains a liquid support medium sufficient to surround the channel and the annular connecting segment of the centrifuge tube.

In another embodiment of the invention, the tube additionally comprises a lower chamber integral with and disposed below the channel, and wherein the diameter of the lower chamber is larger than the diameter of the channel.

According to the invention, there is provided methods of separating components of a sample of biological material, the methods including the steps of placing the sample within a centrifuge tube, wherein the centrifuge tube has an upper chamber disposed on an integrally connected to a channel, and wherein the diameter of the channel is smaller than the diameter of the upper chamber; placing the centrifuge tube within an outer vessel, wherein the outer vessel contains a liquid support medium having a volume sufficient to surround the annular connecting segment of the centrifuge tube; centrifuging the sample, and recovering the fraction of interest.

DESCRIPTION OF THE PREFERRED EMBODIMENTS

Figure 1:
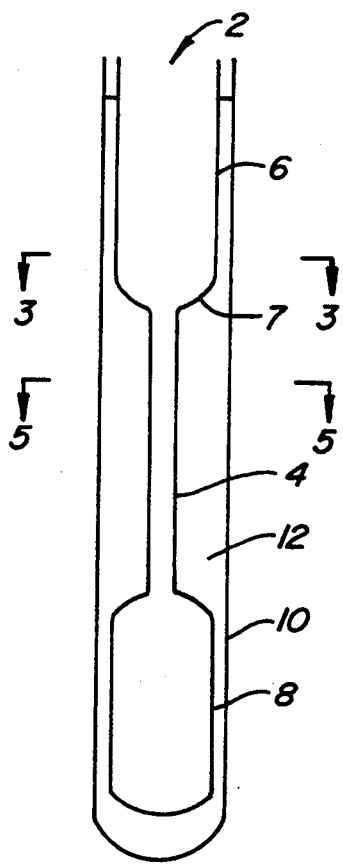
FIG. 1 shows a side view of a centrifuge tube and adapter apparatus of the invention.

Centrifuge tubes may be constructed of any suitable material compatible with the sample and able to withstand the centrifugal forces for the application in which they are used. For example, tubes for use at low gravitational (g) forces may be constructed of rigid materials such as glass, or more flexible materials such as polyethylene or polypropylene. High speed microfuge or ultracentrifuge tubes are constructed of polymers such as polypropylene or polyethylene.

At high centrifugation speeds, flexible tubes exhibit some tube deformation, and may require support at the lower portion of the tube. Support may be provided by the enclosure of the tube within a cavity in the centrifuge rotor. Alternatively, support may be provided by a rigid tube adaptor that snugly encloses the tube, and similarly snugly fits within the cavity in the rotor. In swinging bucket centrifuges, tube containing cavities are not fixed within the rotor, but the tubes are still snugly maintained within the centrifuge buckets.

Tube adaptors conform to the shape of the tube and have outer configurations to match the shape and size of the particular centrifuge for which they are designed, for example as described in U.S. Pat. No. 4,032,066. In other systems, elaborate adaptors may be hinged or bi-partite to provide a tight seal around the outer edge of the tube, as described in U.S. Pat. Nos. 4,692,137, 5,236,409, and PCT Publication WO/91/06373 (International Application No. PCT/US90/06326.

U.S. Pat. No. 4,451,250 describes a tube adaptor to fit inside a cylindrical sample tube, thus providing structural support for the tube from within the tube. A gasket may be required. These types of supports are difficult to use in practice when large numbers of samples must be processed, and are not practical where maintenance of sterility of the sample is important.

Tubes used at high centrifugation speeds are cylindrical, as high g forces may cause tube deformation and collapse, which may lead to sample loss and contamination of the centrifuge with biological materials.

Non-cylindrical centrifuge tubes have been described for specialized uses. In some applications, non cylindrical tubes are used at low centrifuge speeds. For example, Kimura in U.S. Pat. No. 4,861,477 describes a plastic centrifuge tube constructed from two semicylindrical thick plastic blocks, which when joined together define a dumbbell shaped void which acts as the sample carrier. The sample carrier has an intermediate section having a significantly smaller diameter than those of the upper and lower sections, as the thickness of the blocks is increased in these intermediate areas. In several of the Kimura embodiments, a removable plug is provided at the bottom of the tube for access to the cell sample.

Conical tubes may be used to increase the packing of a pellet at the bottom of the tube, thus facilitating removal of the supernatant. Conical tubes have a cylindrical body with a reduced diameter hemisphere, the transition between diameters being accomplished through a conical section, as described in U.S. Pat. No. 4,190,120. Use of these tubes at high speeds requires specialized adaptors to fit the lower conical portion of the tube to provide support for the tube during centrifugation. Adaptors for conical tubes are described, for example, in U.S. Pat. No. 4,990,129.

According to the present invention, there is provided a tube which permits easy access to the sample within the tube, provides increased cell separation due to the shape of the interior walls of the tube, and facilitates recovery of the portion of interest through the widening of the band at the narrowed portion of the tube.

The sample tube of the present invention may be any non-cylindrical tube having a wide upper portion and a narrower lower portion. However, portions of the tube may be cylindrical. For example, at least one of each of the channel, the lower chamber and the upper chamber may be cylindrical, while the tube still maintains a non-cylindrical overall shape. The tube of the present invention is comprised of deformable materials such as polypropylene, polyvinyl chloride with plasticizer, or polyethylene. The tube of the present invention preferably has a wall thickness of less than 2 mm.

In a preferred embodiment of the invention, the tube has an upper chamber and a lower chamber integrally connected with a narrow connecting channel, thus defining an hourglass shaped tube. This embodiment of the invention is illustrated in FIG. 1. The tube (2) of FIG. 1 is hourglass shaped, comprising a narrow connecting channel (4), together with larger upper (6) and lower (8) chambers. The connecting channel and the upper chamber are integrally connected by an annular connecting segment region (7). The annular connecting segment may be planar, or generally concave or convex. The connecting segment should provide a smooth transition between the diameters of the upper chamber and the channel, preferably without presenting any substantially horizontal surfaces upon which cells or other biological material may sediment. The lower chamber (8) is sealed at the bottom, while the upper chamber (6) is open to permit loading of the sample into the tube. In some embodiments, the upper chamber may be sealed by any suitable sealing means such as a removable cap, heat sealing and the like.

Figure 2:
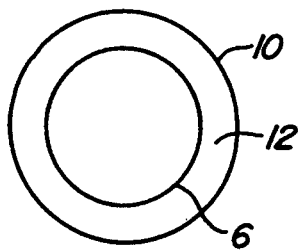
FIG. 2 shows a cross section of the apparatus of FIG. 1 through the line 3—3 of FIG. 1.
Figure 3:
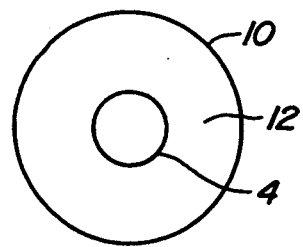
FIG. 3 is a cross section of the apparatus of FIG. 1 through the line 5—5 of FIG. 1.

During centrifugation the sample tube (2) is housed within an outer vessel (10), which contains an adaptor comprising a liquid support medium (12). FIG. 2 shows the tube of FIG. 1 in cross section through line 3—3 of FIG. 1, while FIG. 3 shows the tube of FIG. 1 in cross section through line 5—5 of FIG. 1.

At high speed centrifugation, the liquid medium supports the narrow channel and the annular connecting segment of the tube, in order to prevent tube deformity or collapse. At very low speeds suitable for some applications, the liquid support medium may be omitted. Determination of the speed at which the liquid support medium is required to prevent excessive deformity and collapse of the tube are within the purview of the skilled artisan, and depend on the g force applied, the amount and chemical composition of sample, and the chemical composition and thickness of the tube wall.

The liquid support medium may be any suitable material which will provide support to the sample tube during centrifugation, and which has sufficient fluidity to surround the sample tube upon insertion of the tube into the liquid support medium. Without limiting the generality of the foregoing, suitable liquid support media includes any liquid or gel substance which is capable of surrounding and supporting the sample tube to prevent tube collapse. A preferred liquid support medium is water.

The liquid support medium may be added to the outer vessel before or after the sample tube is inserted into the outer vessel. It is preferred that the weight of the volume of liquid displaced by the sample tube is approximately equal to the weight of the sample and the tube. In embodiments where the diameter of the inner wall of the outer vessel is small enough to contact the upper chamber of the sample tube during centrifugation, the outer vessel itself provides support to the upper chamber. Thus, in these embodiments, the liquid medium is preferably sufficient to support the annular connecting segment and the narrow channel. In this embodiment, the liquid support medium should be pre-inserted into the outer vessel prior to the addition of the sample tube.

In some applications, the outer vessel may be the aperture or cavity of the centrifuge rotor itself, such that the liquid support medium is contained within the cavity, and the sample tube is inserted therein. Similarly, for use with swinging bucket rotors, the bucket may act as the outer vessel, such that the liquid support medium is contained within the swinging bucket.

In other embodiments of the invention, the outer vessel may be any suitable vessel capable of withstanding the g forces applied. Suitable outer vessels include glass or plastic test tubes, rigid plastic tube adaptors, centrifuge bottles and the like. It is preferred that the diameter of the outer vessel is not significantly larger than the diameter of the sample tube, thus preventing excessive lateral movement of the sample tube within the outer vessel during deceleration or acceleration.

In some embodiments of the invention, the outer vessel may contain a plurality of sample tubes arranged within the outer vessel and each supported by the liquid medium. In this embodiment, the liquid support medium is provided in an amount sufficient to surround the narrowed channel portion, the annular connecting segment, and the upper chamber of each sample tube. It is preferred that the weight of the volume of liquid displaced is approximately equal to the combined weight of the sample tubes.

The sample tube of the present invention may be precalibrated, such that for a sample of a given volume, and at a set centrifuge spin speed and time, the desired fraction may be isolated in the narrow portion of the tube, thus widening the fraction band and greatly facilitating the recovery of the desired fraction. In other embodiments of the invention, the tube may be marked with a fill level line to facilitate the recovery of the desired fraction in the narrow portion of the tube.

After centrifugation, the tube is removed from the outer vessel. The fraction may be easily obtained depending on the location of the fraction of interest within the tube. Use of a precalibrated tube for a particular sample type and volume will enable the fraction of interest to be located in the channel of the tube after centrifugation. Where the tube is a heat deformable and sealable plastic such as polypropylene, the portions of the tube above and below the fraction of interest may be sealed off, and the fraction thus easily isolated from the channel. Similarly the walls of the sample tube may be cut with a scalpel or other similar object to separate the fraction of interest from the other bands.

Where the fraction of interest is in the lower portion of the tube, the fraction may be recovered by sealing off the channel such that lower density fractions do not contaminate the fraction to be recovered.

In use, the location of the fraction of interest within the tube may be manipulated by the addition of a biologically acceptable, non-water soluble liquid having a greater density than the sample. A preferred liquid is Fluorinert TM (Sigma Chemical Co.), a liquid mixture of completely fluorinated aliphatic compounds, having a density of 1.8 g/ml.

Figure 4:
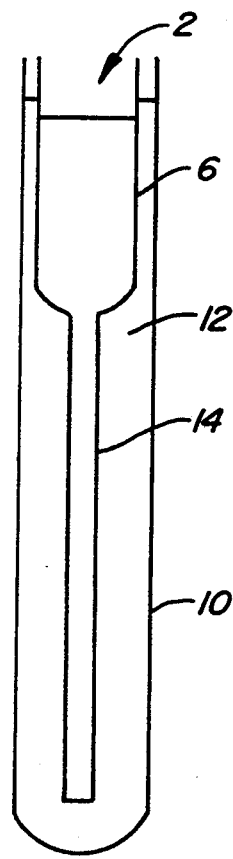
FIG. 4 shows a side view of an alternative embodiment of a centrifuge tube and adapter apparatus of the invention.

Another preferred tube of the present invention is that shown in FIG. 4, wherein the tube (2) has wide upper chamber (6) connected to a narrow lower chamber (14) which is sealed at its lower edge. The tube is immersed in an outer vessel (10) which contains a liquid support medium (12) at a level sufficient to immerse the entire narrow lower portion of the tube. A particularly suitable tube for centrifuging small samples according to FIG. 4 is a plastic transfer pipet, with the narrow, bottom chamber heat sealed, and a transverse opening cut into the bulb portion, which acts as the upper chamber of the tube. Suitable transfer pipets for use in this embodiment of the invention include general purpose, graduated, fine tip, and narrow stem transfer pipets, and are available from Sigma Chemical Co., St. Louis, Mo.

The tube may be used for any centrifugation application. A preferred application is for the separation of components of biological material. As used herein, biological material includes prokaryotic cells, eukaryotic cells, and cell fragments from any source, including primary cells and cell cultures; cell membranes; viruses; macromolecules such as nucleic acids, proteins, lipids and the like and combinations thereof; cellular components such as nuclei, liposomes, ribosomes, mitochondria and the like or combinations thereof; biological fluids such as urine, saliva, blood or fractions or combinations thereof; and any combination of the above.

Figure 5:
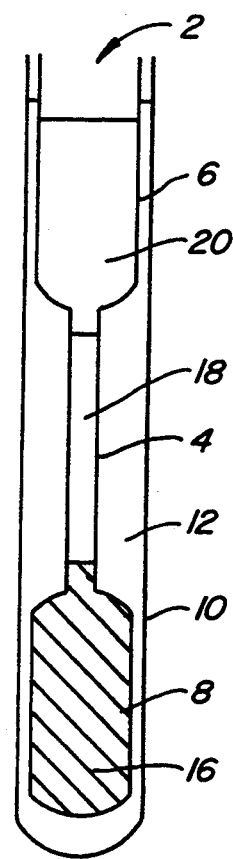
FIG. 5 shows the apparatus of FIG. 1 after centrifugation of a whole blood sample.

A particularly preferred application is the separation of whole blood components, as described in copending U.S. patent application Ser. No. 08/190327, the contents of which are hereby incorporated by reference. Whole blood is applied to the upper chamber of the tube. The tube is spun at a plurality of increasing speeds to facilitate separation of the cells by density. The resulting sample fractionation of whole blood using the tube of FIG. 1 is shown in FIG. 5. After centrifugation, the lower portion of the tube contains a pellet of red blood cells (16). The middle layer (18) contains the top of the red blood cell layer and the "buffy coat" layer containing the leukocytes, granulocytes, and other mononuclear cells, while the upper layer (20), found primarily in the upper chamber, contains the low density plasma fraction.

During centrifugation, the shape of the walls of the sample tube impart separation characteristics to the sample. Without intending to be limited to any particular theory, it is believed that the movement of the sample through the tube toward the narrowed channel portion provides movement of the cells in a non-vertical path. This leads to a zone of turbulence in the lower section of the upper chamber, and provides an increased tendency of cells to separate according to their densities and separation characteristics than may be attained with a cylindrical tube. The plasticity of the tube leads to slight and repeated tube deformities during centrifugation, which provides additional movement of the cells relative to the walls of the tube and relative to each other. Thus, by providing non-linear movement of the cells relative to each other within the tube, and thus fluid turbulence at the upper entrance to the channel, the tendency of the cells to clump together is decreased, which in turn decreases the incidence of cells having different sedimentation characteristics being trapped within an aggregation of cells.

All publications, patents, and patent applications herein are incorporated by reference to the same extent as if each individual publication or patent application was specifically and individually indicated to be incorporated by reference.

The foregoing description of the preferred embodiments of the present invention has been presented for purposes of illustration and description. They are not intended to be exhaustive or to limit the invention to the precise form disclosed, and many modifications and variations are possible in light of the above teaching, and are intended to be within the scope of the invention.

Although the foregoing invention has been described in some detail by way of illustration and example, for purposes of clarity of understanding, it will be obvious that certain changes and modifications may be practiced within the scope of the appended claims.

What is claimed is:

1. A tube and adapter apparatus for the centrifugation of a sample, the apparatus comprising:
   a) a centrifuge tube having an upper chamber disposed on and integrally connected to a channel by an annular connecting segment, wherein the diameter of the channel is smaller than the diameter of the upper chamber; and
   b) an outer vessel having a top and a bottom, the top having an aperture, the aperture being capable of receiving the centrifuge tube therein, and wherein the outer vessel contains a liquid support medium sufficient to surround the channel and the annular connecting segment of the centrifuge tube.

2. The apparatus of claim 1 wherein the centrifuge tube additionally comprises a lower chamber integral with and disposed below the channel, and wherein the diameter of the lower chamber is larger than the diameter of the channel.

3. The apparatus of claim 2 wherein the outer vessel is a centrifuge rotor cavity.

4. The apparatus of claim 2 wherein the outer vessel is a test tube.

5. The apparatus of claim 2 wherein the centrifuge tube is polypropylene.

6. The apparatus of claim 2 wherein the centrifuge tube is polyethylene.

7. The apparatus of claim 2 wherein the liquid support medium is water.

8. The apparatus of claim 1 wherein the liquid support medium has a volume and the tube and sample have a volume equivalent to a weight wherein the weight of the volume of the tube and sample displace an approximately equivalent weight of the liquid support medium.

9. A method of separating components of a sample of biological material, the method comprising the steps of:

a) placing the sample within a centrifuge tube, wherein the centrifuge tube has an upper chamber disposed on and integrally connected to a channel by an annular connecting segment, and wherein the diameter of the channel is smaller than the diameter of the upper chamber;

b) placing the centrifuge tube within an outer vessel, wherein the outer vessel contains a liquid support medium sufficient to surround the annular connecting segment of the centrifuge tube; and c) centrifuging the sample to separate a component of a sample of the biological material.

10. The method of claim 8 wherein the sample of biological material is blood.

11. The method of claim 10, additionally comprising the step of recovering the component of the sample from the channel of the centrifuge tube.

12. The method of claim 8 wherein the liquid support medium is water.

13. The method of claim 8 wherein the sample additionally comprises a biologically inert material having a density greater than the density of at least a portion of the biological material.

* * * * *